(12) United States Patent
Arnault et al.

(10) Patent No.: US 11,396,938 B2
(45) Date of Patent: Jul. 26, 2022

(54) PULLEY DEVICE, IN PARTICULAR FOR TENSIONING IDLER OR RUNNER ROLLER

(71) Applicant: Aktiebolaget SKF, Gothenburg (SE)

(72) Inventors: Benoit Arnault, Saint-Cyr-sur-Loire (FR); Gwenael Hingouet, Saint-Cyr-sur-Loire (FR); Kévin Lefort, Donges (FR); Simon Prevost, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 321 days.

(21) Appl. No.: 16/837,043

(22) Filed: Apr. 1, 2020

(65) Prior Publication Data

US 2020/0386304 A1    Dec. 10, 2020

(30) Foreign Application Priority Data

Jun. 5, 2019   (DE) .......................... 102019208175.4

(51) Int. Cl.
| | |
|---|---|
| *F16H 55/44* | (2006.01) |
| *F16C 19/06* | (2006.01) |
| *F16H 55/36* | (2006.01) |

(52) U.S. Cl.
CPC ............. *F16H 55/44* (2013.01); *F16C 19/06* (2013.01); *F16H 55/36* (2013.01)

(58) Field of Classification Search
CPC .... F16C 13/006; F16C 2361/63; F16C 19/06; F16C 2226/74; F16H 2007/0865; F16H 55/36; F16H 55/44
USPC .................................................. 474/199, 166
See application file for complete search history.

(56) References Cited

U.S. PATENT DOCUMENTS

| | | | | |
|---|---|---|---|---|
| 1,482,579 A | * | 2/1924 | Nice ....................... | F16C 33/60 384/546 |
| 1,627,558 A | * | 5/1927 | Grunwald ............. | F16C 13/006 29/524.1 |
| 1,628,220 A | * | 5/1927 | Nanstad ................. | B65G 39/02 384/417 |
| 1,845,631 A | * | 2/1932 | Seelbach ................ | E05D 13/00 474/183 |
| 1,848,144 A | * | 3/1932 | Pribil ....................... | B60L 5/06 474/199 |
| 1,976,019 A | * | 10/1934 | Heim ...................... | F16C 33/64 29/512 |

(Continued)

FOREIGN PATENT DOCUMENTS

| | | |
|---|---|---|
| DE | 202005011230 U1 | 9/2005 |
| GB | 141829 A | 4/1920 |

*Primary Examiner* — Henry Y Liu
(74) *Attorney, Agent, or Firm* — Garcia-Zamor Intellectual Property Law; Ruy Garcia-Zamor; Bryan Peckjian (57) ABSTRACT

The pulley device provides a pulley and a bearing. The pulley has two C-shaped pulley parts having each an inner portion mounted on the bearing, an outer portion having an outer cylindrical surface dedicated to interact with a belt or a chain, and an intermediate portion extending substantially radially between axial ends of inner and outer portions on one axial side of pulley device. Free ends of outer portions each include a hook-shaped portion. A first one of the hook-shaped portions axially overlapping a second one of the hook-shaped portions. The hook-shaped portions configured to cooperate together in order to attach one outer portion to the other.

4 Claims, 7 Drawing Sheets

(56) References Cited

U.S. PATENT DOCUMENTS

| | | | | |
|---|---|---|---|---|
| 2,349,281 | A * | 5/1944 | Kendall | F16H 7/20 384/547 |
| 2,655,813 | A * | 10/1953 | Howell | F16H 55/36 384/547 |
| 2,669,878 | A * | 2/1954 | Nelson | F16H 55/44 474/181 |
| 2,717,814 | A * | 9/1955 | Grant | B65G 39/02 384/510 |
| 3,367,199 | A * | 2/1968 | Dankowski | F16H 55/42 474/182 |
| 3,490,285 | A * | 1/1970 | Donath | F16H 7/12 474/187 |
| 3,789,683 | A * | 2/1974 | Frost | F16H 55/44 474/181 |
| 3,842,475 | A * | 10/1974 | Clasper | B21D 53/26 228/113 |
| 3,915,511 | A * | 10/1975 | Clasper | B60B 3/08 474/197 |
| 4,073,551 | A * | 2/1978 | Sutowski | F16C 19/18 384/510 |
| 4,402,678 | A * | 9/1983 | St. John | B23P 11/00 474/171 |
| 4,443,210 | A * | 4/1984 | Olschewski | F16H 55/44 474/902 |
| 4,457,740 | A * | 7/1984 | Olschewski | F16C 13/006 474/112 |
| 4,474,562 | A * | 10/1984 | Heurich | F16H 7/1281 29/520 |
| 4,504,252 | A * | 3/1985 | Honma | F16C 13/006 474/135 |
| 4,516,962 | A * | 5/1985 | Brandenstein | F16H 7/1281 474/112 |
| 4,518,372 | A * | 5/1985 | Dye | F16C 13/006 474/94 |
| 4,591,352 | A * | 5/1986 | Olschewski | F16H 7/1281 474/112 |
| 4,600,400 | A * | 7/1986 | Hallerback | B66D 3/08 474/166 |
| 4,610,645 | A * | 9/1986 | Donn | F16H 7/1281 474/112 |
| 4,610,646 | A * | 9/1986 | Walter | F16H 7/20 474/197 |
| 4,831,705 | A * | 5/1989 | Kanemitsu | B21D 53/261 72/82 |
| 4,917,655 | A * | 4/1990 | Martin | F16H 7/1281 474/135 |
| 5,019,019 | A * | 5/1991 | Jones | F16H 55/50 474/166 |
| 5,454,760 | A * | 10/1995 | Aranibar | F16H 55/44 474/181 |
| 5,630,769 | A * | 5/1997 | Schmidt | F16C 13/006 474/902 |
| 5,725,448 | A * | 3/1998 | Kato | F16C 13/006 384/510 |
| 5,728,020 | A * | 3/1998 | Muranaka | C10M 107/02 384/462 |
| 6,010,420 | A * | 1/2000 | Niki | F16C 19/166 474/199 |
| 6,102,822 | A * | 8/2000 | Nakazeki | F16C 33/416 384/523 |
| 6,196,720 | B1 * | 3/2001 | Nozaki | C10M 169/02 384/13 |
| 6,220,982 | B1 * | 4/2001 | Kawashima | F16H 55/44 384/536 |
| 6,241,257 | B1 * | 6/2001 | Hauck | F16C 13/006 384/489 |
| 6,270,001 | B1 * | 8/2001 | Tadic | B23P 15/003 228/256 |
| 6,293,885 | B1 * | 9/2001 | Serkh | F16H 55/44 474/133 |
| 6,605,574 | B2 * | 8/2003 | Asao | F16C 13/006 508/552 |
| 6,692,393 | B2 * | 2/2004 | Fukuwaka | F16C 33/7853 474/135 |
| 7,485,059 | B2 * | 2/2009 | Fadler | F16H 55/44 474/166 |
| 8,617,016 | B2 * | 12/2013 | Dutil | F16H 55/40 474/166 |
| 8,651,988 | B2 * | 2/2014 | Kapfer | F16C 13/006 474/135 |
| 8,790,018 | B2 * | 7/2014 | Leuver | B65G 39/09 384/546 |
| 9,416,863 | B2 * | 8/2016 | Schaefer | F16H 55/48 |
| 9,453,571 | B2 * | 9/2016 | Qin | F16H 55/44 |
| 10,030,758 | B2 * | 7/2018 | Basile | F16H 55/36 |
| 10,088,031 | B2 * | 10/2018 | Koda | F16H 55/44 |
| 10,220,432 | B2 * | 3/2019 | Pan | B21D 22/14 |
| 10,228,051 | B2 * | 3/2019 | Basile | F16H 55/36 |
| 10,393,252 | B2 * | 8/2019 | Liege | F16H 7/08 |
| 2004/0178398 | A1 * | 9/2004 | Miller | F16H 55/44 474/166 |
| 2007/0232427 | A1 * | 10/2007 | Ueno | F16H 55/48 474/166 |
| 2008/0300077 | A1 * | 12/2008 | Kapfer | F16C 13/006 474/133 |
| 2009/0191999 | A1 * | 7/2009 | Joseph | F16H 55/36 384/485 |
| 2014/0179476 | A1 * | 6/2014 | Qin | F16H 55/44 474/166 |

* cited by examiner

PULLEY DEVICE, IN PARTICULAR FOR TENSIONING IDLER OR RUNNER ROLLER

CROSS-REFERENCE TO RELATED APPLICATIONS

This application claims priority to French Patent Application no. 102019208175.4, filed Jun. 5, 2019, the contents of which is fully incorporated herein by reference.

TECHNICAL FIELD OF THE INVENTION

The present invention relates to the field of pulley devices for tensioning idlers or runner rollers designed to interact with a chain or a belt, for example a distribution belt of an internal combustion engine of a vehicle.

BACKGROUND OF THE INVENTION

Such rollers are usually used to keep a constant tension on the belt or chain in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

It is known by document GB 141 829 a pulley comprising a peripheral part intended to be in contact with a belt, an inner part and a intermediate part between the inner and outer parts. The pulley is tightened to the outer ring of bearing, but the pulley can slightly axially move during the service use of pulley device. Moreover, with a pulley such as disclosed, the outer part may be deformed radially inwards by bending under the action of the belt.

It has been proposed in document DE 202005011230 U1 to house a damping ring within a C-shaped pulley, the damping element being dedicated to damp vibrations from the belt and being suitable to limit radial inward deformation of outer portion of the pulley. However, the pulley can still be deformed under heavy loads.

SUMMARY OF THE INVENTION

The aim of the invention is to overcome these drawbacks by proposing a pulley which is easy to install onto a bearing, of good rigidity, adapted to avoid an early wear of the belt, and permitting an efficient support of the belt.

To this end, the invention relates to a pulley device suitable for a belt of chain tensioning idler or runner roller, comprising a bearing and a pulley.

The bearing comprises a rotatable outer ring and a fixed inner ring, the rings being coaxial.

The pulley comprises two pulley parts having each in cross section an overall shape of a C, and having each an inner portion with an inner surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer cylindrical portions on one axial side of pulley device, the pulley parts being each formed integral and defining each an open end on one axial side opposite to the intermediate portion, the open ends of the two pulley parts axially facing each other, free ends of outer portions of pulley parts being in axial abutment.

According to the invention, both free ends of outer portions of pulley parts comprise each a hook-shaped portion, one hook-shaped portion axially overlapping the other hook-shaped portion, the hook-shaped portions being of corresponding shapes and in cooperation to attach the outer portions one to the other.

According to further aspects of the invention which are advantageous but not compulsory, such a pulley device may incorporate one or several of the following features:

The bearing is a rolling bearing, at least one row of rolling elements being radially interposed between the inner ring and the outer ring.

The rolling elements are balls.

The rolling elements are equally circumferentially spaced and maintained by an annular cage.

The inner portions of pulley parts are cylindrical, having each an inner cylindrical portion.

The inner cylindrical portions of pulley parts are force fitted onto the outer cylindrical surface of outer ring.

The pulley parts are made from a stamped metal sheet or blank.

The hook-shaped portions comprise each an inclined engaging surface.

Engaging surface is a plane surface.

Engaging surface is a curved surface.

BRIEF DESCRIPTION OF THE DRAWINGS

The invention will now be explained in correspondence with the annexed figures, as illustrative examples, without restricting the object of the invention. In the annexed figures.

DETAILED DESCRIPTION OF SOME EMBODIMENTS

Figure 1:
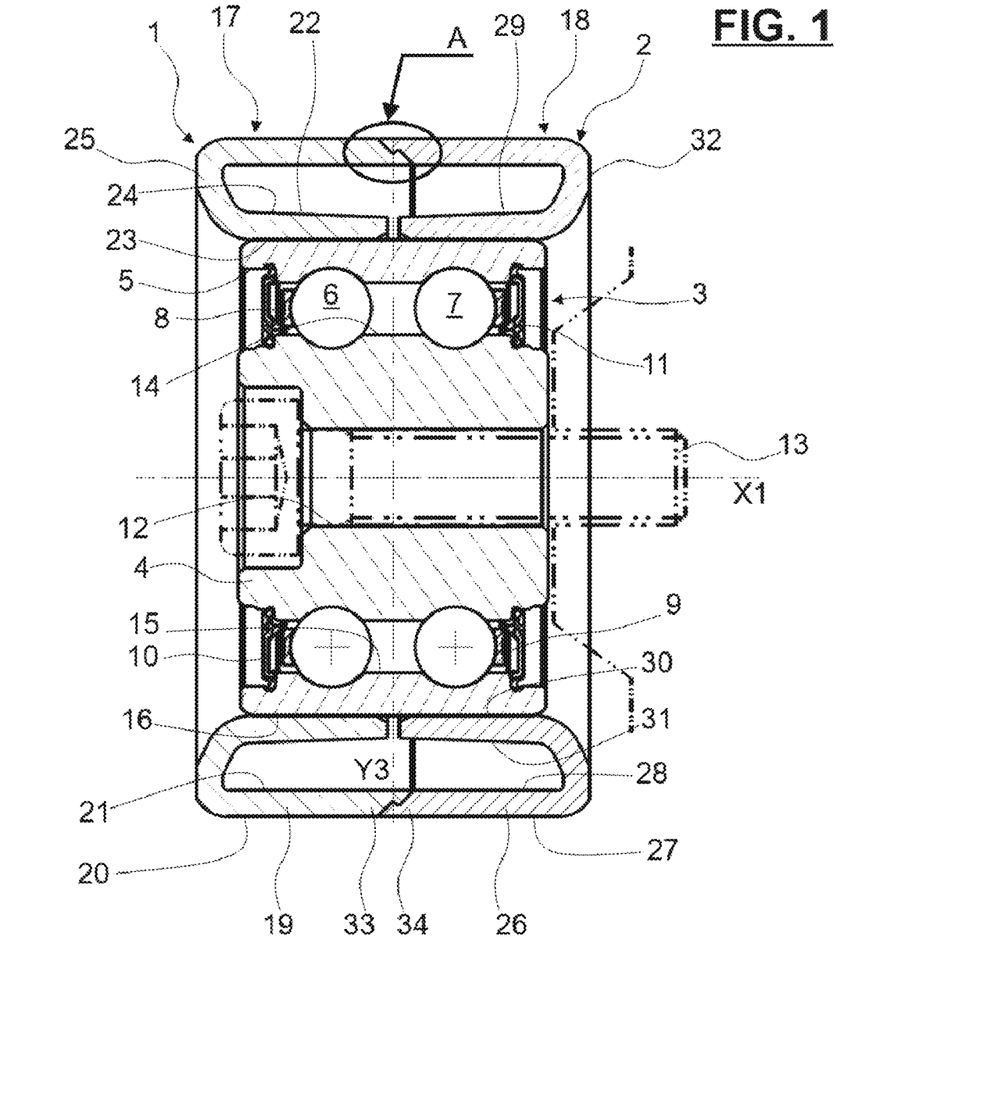
FIG. 1 is an axial section of a pulley device according to a first embodiment of the invention.
Figure 2:
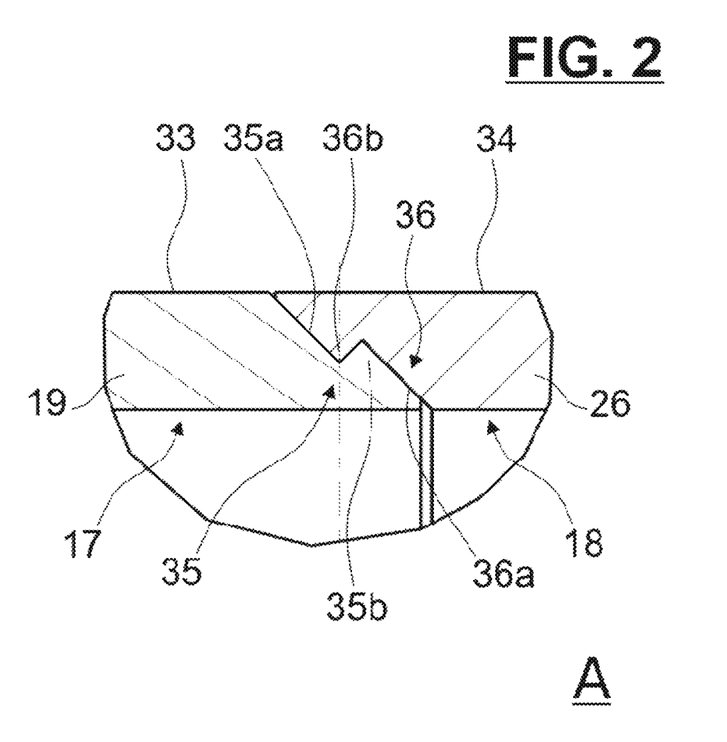
FIG. 2 is a detailed view A of the pulley device of FIG. 1.
Figure 3:
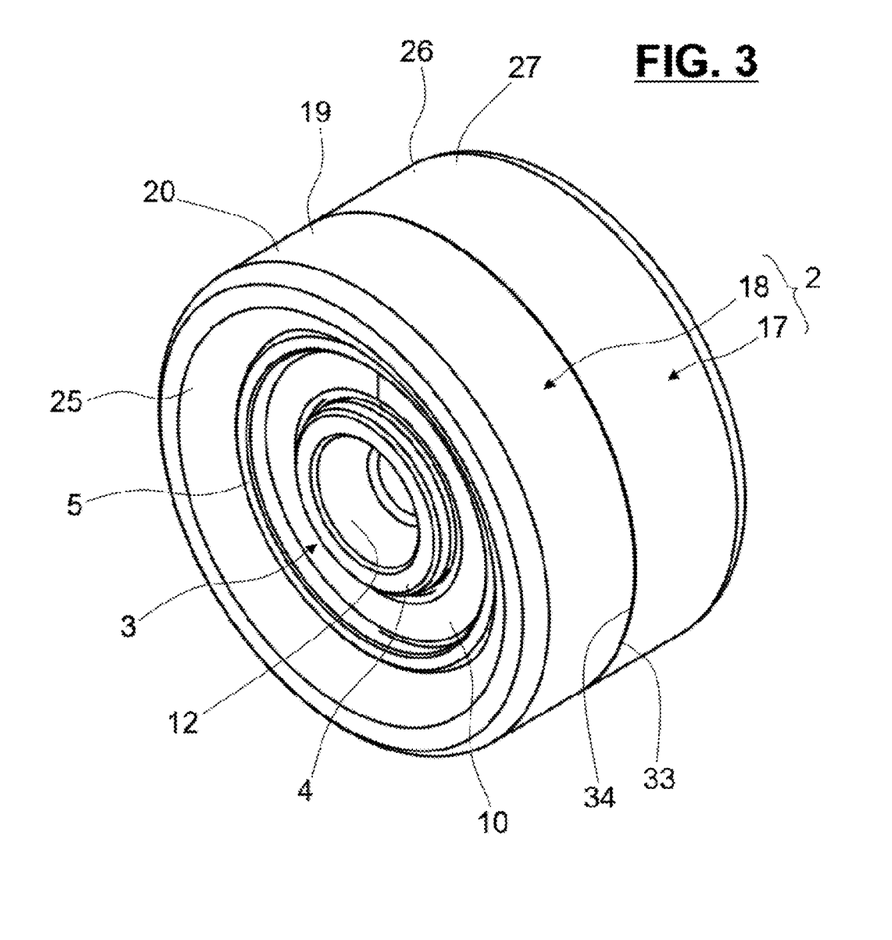
FIG. 3 is a perspective view of the pulley device of FIG. 1.

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of the rolling elements 6, 7, and two annular seals 10, 11.

The inner ring 4 and the outer ring 5 are concentric and symmetric with respect to a transverse radial plane Y3 passing through the centre of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 dedicated to receive a fastening screw 13 (in dotted line) to fasten the device 1 on an external support. The inner ring further comprises an outer cylindrical surface 14 onto which toroidal circular raceways are formed, the raceways having in cross section a concave internal profile adapted to the rolling elements 6, 7.

The outer ring 5 comprises a cylindrical bore 15 onto which toroidal circular raceways are formed, the raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing a cylindrical inner surface or bore 23 into which the outer cylindrical surface 16 of outer ring 5 of bearing 3 is mounted, and a cylindrical outer surface 24.

The outer portion 19 is of larger diameter than that of the inner portion 22, the outer portion 19 radially surrounding the inner portion 22. Advantageously, the outer portion 19 is of greater axial length than that of the inner portion 22, the outer portion 19 protruding axially on at least one axial side of the inner portion 22.

The first pulley part 17 further comprises an annular radial intermediate portion 25 extending substantially radially between axial ends of inner and outer cylindrical portions 22, 19 on a first axial side of pulley device 1.

The first pulley part 17 then has in cross section an overall shape of a C, defining an open end on one axial side of the pulley device 1. The first pulley part 17 is formed integral.

The second pulley part 18 comprises an axial annular outer portion 26 providing a cylindrical outer surface 27 designed to interact with a portion the belt of the chain, and a cylindrical inner surface or bore 28.

The second pulley part 18 also comprises an axial annular inner portion 29 providing a cylindrical inner surface or bore 30 into which the outer cylindrical surface 16 of outer ring 5 of bearing 3 is mounted, and a cylindrical outer surface 31.

The outer portion 26 is of larger diameter than that of the inner portion 29, the outer portion 26 radially surrounding the inner portion 29. Advantageously, the outer portion 26 is of greater axial length than that of the inner portion 29, the outer portion 26 protruding axially on at least one axial side of the inner portion 29.

The second pulley part 18 further comprises an annular radial intermediate portion 32 extending substantially radially between axial ends of inner and outer cylindrical portions 29, 26 on a second axial side of pulley device 1, the second axial side being axially opposite to the first axial side.

The second pulley part 18 then has in cross section an overall shape of a C, defining an open end on one axial side of the pulley device 1. The second pulley part 18 is formed integral.

Advantageously, the pulley parts 17, 18 are both made of thin metal sheet or blank by folding, cutting and stamping.

Advantageously, the inner cylindrical portions 22, 29 of first and second pulley parts 17, 18 are force fitted onto the outer cylindrical surface 16 of outer ring 5.

The two C-shaped pulley parts 17, 18 are arranged symmetrically with each other with respect to the radial plane Y3. The free ends 33, 34 of outer portions 19, 26 of first and second pulley parts 17, 18 respectively come into contact in an axial direction, the open ends being axially open to each other. The two outer cylindrical surfaces 20, 27 form a surface dedicated to interact with the belt or the chain. The pulley 2 formed by the two pulley parts 17, 18 arranged in axial contact with each other is suitable for guiding, supporting the belt of the chain with an efficient manner.

According a first embodiment of the invention, both free ends 33, 34 of outer portions 19, 26, respectively, comprise each a hook-shaped portion 35, 36. In the embodiment illustrated in FIGS. 1 to 3, the hook-shape portions 35, 36 are annular.

As illustrated in FIG. 2, the first hook-shape portion 35 of free end 33 comprises a recess 35a wherein a protruding portion 35b outwardly axially extends. Surfaces of recess 35a and protruding portion 35b are plane, the hook-shape portion 35 having a sawtooth shape. A groove is defined within the recess 35a. In the illustrated embodiment, the protruding portion 35b does not extend axially beyond the outer cylindrical surface 20 of outer cylindrical portion 19.

Similarly, the second hook-shape portion 36 of free end 34 comprises a recess 36a wherein a protruding portion 36b outwardly axially extends. Surfaces of recess 36a and protruding portion 36b are plane, the hook-shape portion 36 having a sawtooth shape. A groove is defined within the recess 36a. In the illustrated embodiment, the protruding portion 36b does not extend axially beyond the outer cylindrical surface 27 of outer cylindrical portion 26.

Hook-shaped portion 34 of second pulley part 18 axially overlaps the other hook-shaped portion 33 of first pulley part 17. The hook-shaped portions 33, 34 are of corresponding shapes and in cooperation to attach outer portions 19, 26 of the pulley parts 17, 18 one to the other.

More precisely, the protruding portion 35b of first hook-shaped portion 35 fits into the groove of recess 36a of second hook-shaped portion 36, and the protruding portion 36b of second hook-shaped portion 36 fits into groove of the recess 35a of first hook-shaped portion 35. Hook-shaped portions 35, 36 are design so as to ensure a rather smooth outer cylindrical surface 20, 27 of attached outer portions 19, 26.

Advantageously, front surfaces of protruding portions 35b, 36b are inclined symmetrically in order to ease to radial sliding to attach them.

A second embodiment of the invention is illustrated in FIGS. 4 to 7. The free ends 33, 34 of outer portions 19, 26 of first and second pulley parts 17, 18, comprise each a hook-shape portion 37, 38, respectively, of rounded shape. Advantageously, front surfaces of portions 37, 38 are rounded in order to ease to radial sliding to attach them.

Figure 4:
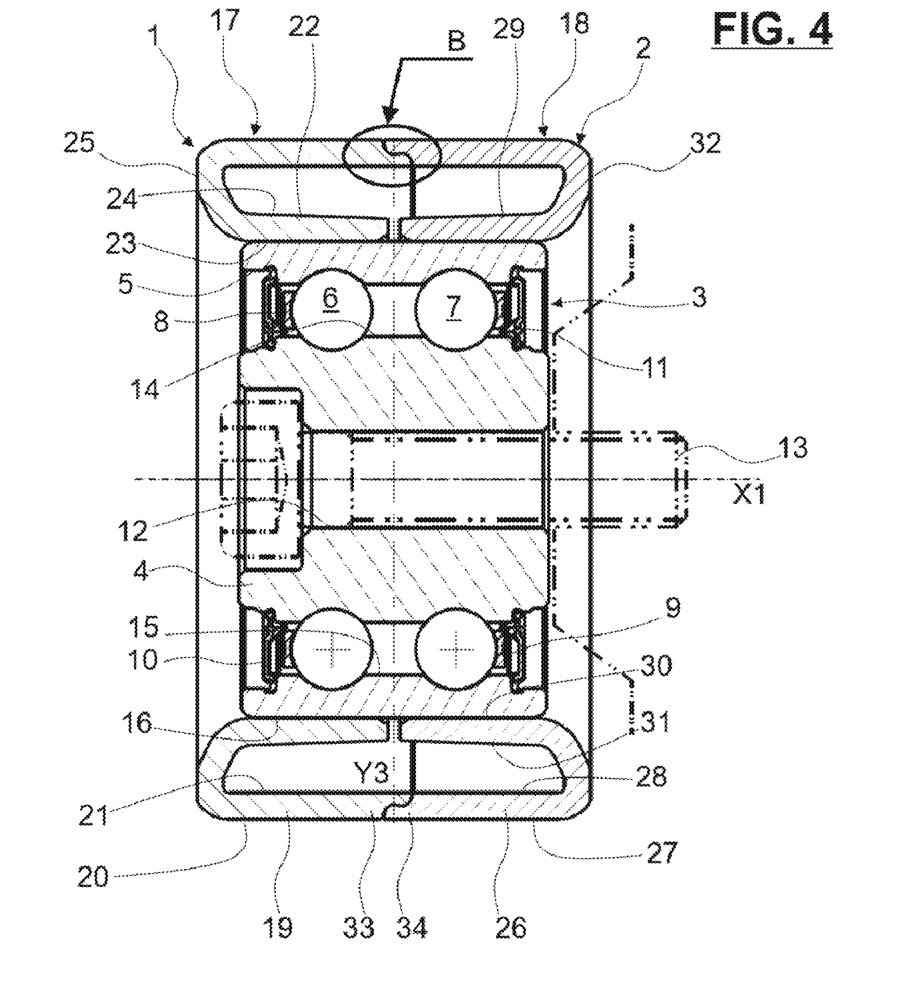
FIG. 4 is an axial section of a pulley device according to a second embodiment of the invention.
Figure 5:
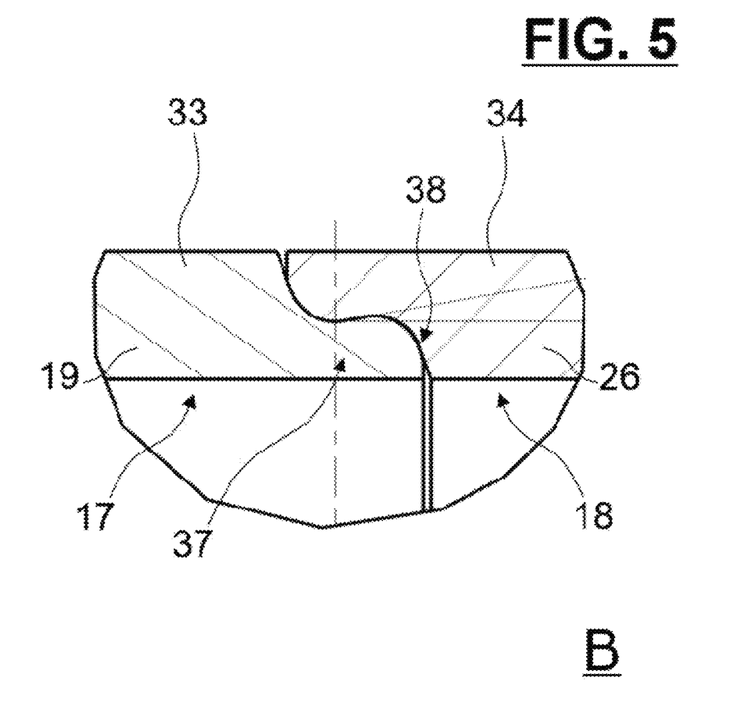
FIG. 5 is a detailed view B of the pulley device of FIG. 4.

Hook-shaped portion 38 of second pulley part 18 axially overlaps the other hook-shaped portion 37 of first pulley part 17. The hook-shaped portions 37, 38 are of corresponding shapes and in cooperation to attach outer portions 19, 26 of the pulley parts 17, 18 one to the other.

According to one embodiment, the hook-shape portions 37, 38 are annular as illustrated in FIG. 3. Alternatively, the hook-shape portions 37, 38 have each an angular extension of less than 360°. In the illustrated embodiment of FIGS. 6 and 7, the free ends 33, 34 comprise each four hook-shape portions 37, 38 in the peripheral direction. Two hook-shape portions 37 of end 33 are dedicated to overlap two corresponding hook-shape portions 38 of other end 34, and the other two hook-shape portions 37 of end 33 are dedicated to overlap the other two corresponding hook-shape portions 38 of other end 34.

Alternatively, the pulley parts 17, 18 may comprise each only one hook-shape portion of angular extension of less than 360°, two, or more than two.

Figure 6:
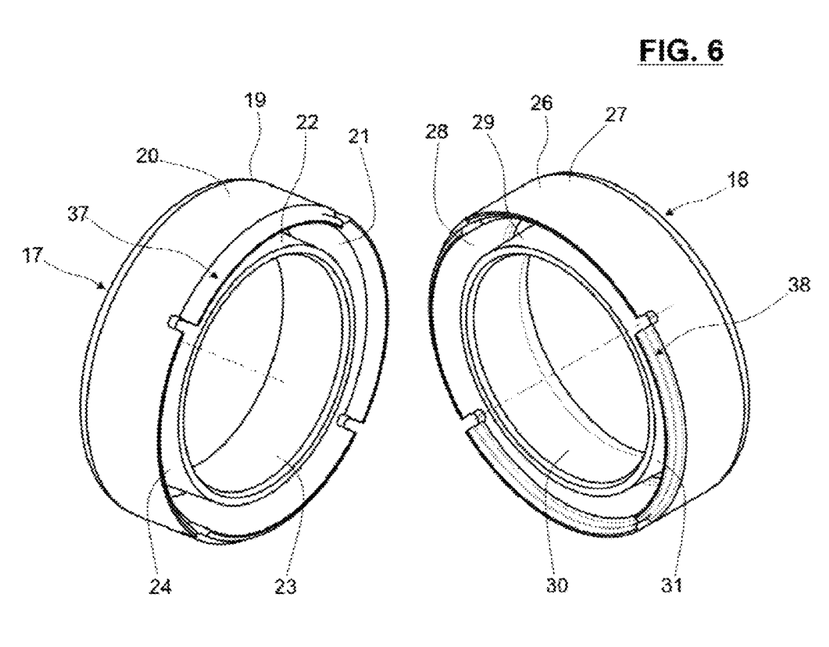
FIG. 6 is a perspective view of a disassembled pulley provided to the pulley device of FIG. 4.
Figure 7:
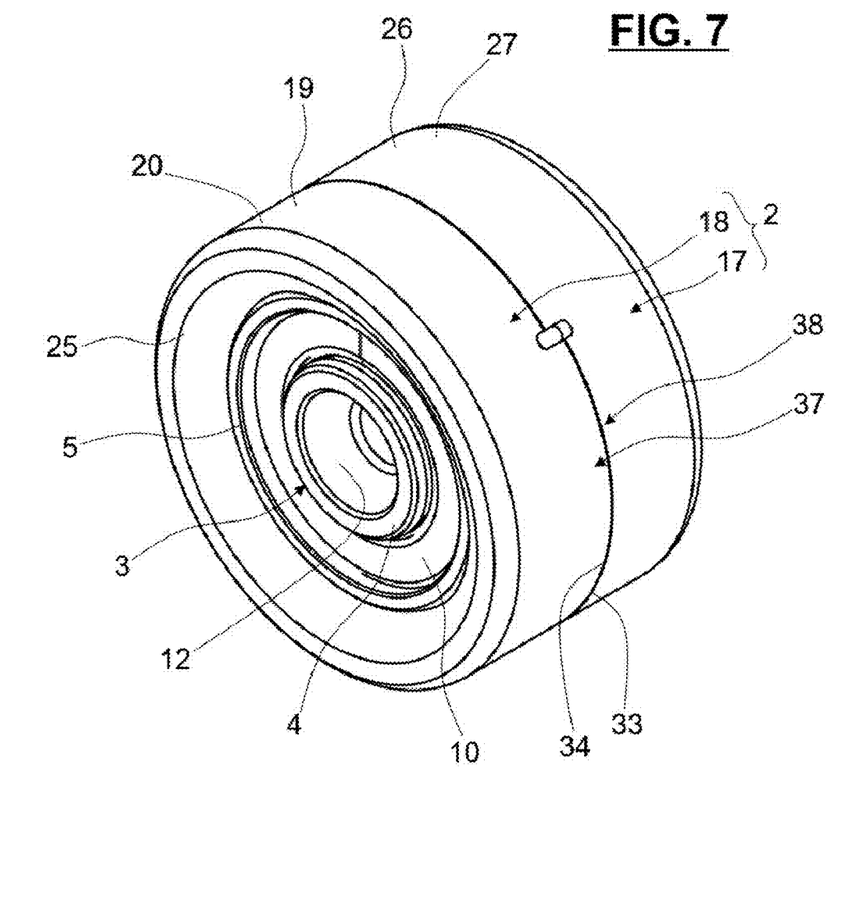
FIG. 7 is a perspective view of the pulley device of FIG. 4.

The FIG. 6 illustrates rounded hook-shape portions 37, 38. Alternatively, the hook-shape portions may be as the one illustrated in FIGS. 1 and 2.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependent claims below, may be combined in ways that are not specifically and explicitly enumerated in order to provide additional useful embodiments of the present teachings.

The invention claimed is:

1. A pulley device suitable for a belt or chain tensioning idler or runner roller, comprising:
   a bearing having a rotatable outer ring and a fixed inner ring, the rings being coaxial, and
   a pulley providing two pulley parts each having in cross section an overall shape of a C, and each having an inner portion with an inner surface mounted on an outer cylindrical surface of the outer ring of the bearing, an outer cylindrical portion having an outer cylindrical surface in contact with the belt or the chain, and a radial intermediate portion extending substantially radially between axial ends of the inner cylindrical portion and the outer cylindrical portion on one axial side of pulley device, the pulley parts each being integrally formed and each defining an open end on one axial side opposite to the intermediate portion, the open ends of the two pulley parts axially facing each other, wherein free ends of the outer portions of the pulley parts are in axial abutment, and wherein
   both free ends each comprise a hook-shaped portion, a first hook-shaped portion axially overlapping a second hook-shaped portion, the hook-shaped portions configured to cooperate together in order to attach one outer portion to the other.

2. Pulley device according to claim 1, wherein the hook-shaped portions comprise each an inclined engaging surface.

3. Pulley device according to claim 2, wherein engaging surface is a plane surface.

4. Pulley device according to claim 2, wherein engaging surface is a curved surface.

* * * * *